United States Patent [19]
Furuya et al.

[11] Patent Number: 5,479,483
[45] Date of Patent: Dec. 26, 1995

[54] PRIVATE RADIO SYSTEM FOR DELIVERING INCOMING CALLS TO A MOBILE SUBSCRIBER

[75] Inventors: Tsuneo Furuya, Yokohama; Yohichi Ogawa, Kanagawa, both of Japan

[73] Assignee: Hitachi, Ltd., Tokyo, Japan

[21] Appl. No.: 12,956

[22] Filed: Feb. 3, 1993

[30] Foreign Application Priority Data

Feb. 7, 1992 [JP] Japan .................................. 4-022322

[51] Int. Cl.$^6$ ................................................ H04M 11/00
[52] U.S. Cl. ................................ 379/60; 379/59; 379/61; 455/33.1; 455/33.2
[58] Field of Search ................................ 379/58, 59, 60, 379/61, 63; 455/33.1, 33.2, 54.1, 54.2, 56.1

[56] References Cited

U.S. PATENT DOCUMENTS

| | | | |
|---|---|---|---|
| 4,833,702 | 5/1989 | Shitara et al. | 379/60 |
| 4,843,622 | 6/1989 | Yotsutani et al. | 379/59 |
| 4,879,740 | 11/1989 | Nagashima et al. | 379/61 |

FOREIGN PATENT DOCUMENTS

| | | | |
|---|---|---|---|
| 59-27634 | 2/1984 | Japan . | |
| 2193861 | 2/1988 | United Kingdom | 379/61 |

OTHER PUBLICATIONS

Electronic Industries Assoc., EIA/TIA Interim Standard 41.3–A, Jan. 1991.
Straw Man for Automatic Roaming, EIA, Jun. 1985.

Primary Examiner—Curtis Kuntz
Assistant Examiner—G. J. Oehling
Attorney, Agent, or Firm—Antonelli, Terry, Stout & Kraus

[57] ABSTRACT

A private network system including mobile radio telephones is able to originate connection and terminate connection even when any of the mobile radio telephones are moved from one exchange where the position of the mobile radio telephone is registered to another exchange. In the private network system which comprises a plurality of exchanges for switching telephones, each of the exchanges includes one or more radio connection controllers for radio communicating with mobile radio telephones, and a plurality of mobile radio telephones connected through the radio connection controller to the exchange for switching, the radio connection controller has an area in which the controller can communicate with the mobile radio telephones. Each of the mobile radio telephones has detection means for detecting movement thereof from the area to a different area and position registration means, upon movement of the telephone to the different area, for reporting the position thereof to the home exchange through the radio connection controller, and each of the exchanges has determination means for determining whether or not a mobile radio telephone has moved from an area of radio connection controller contained in a different exchange and transfer means for transferring a terminating call to the different exchange when appropriate.

14 Claims, 8 Drawing Sheets

PBX100 OFFICE

| | EXTENSION NO. | RT-ID | RC-ID | OFFICE NO. |
|---|---|---|---|---|
| HOME AREA | 2111 | 0111 | 0110 | — |
| | 2112 | 0112 | — | 300 |
| | ⋮ | ⋮ | ⋮ | ⋮ |
| VISITOR AREA | 3111 | — | — | — |
| | 3112 | — | — | — |
| | ⋮ | ⋮ | ⋮ | ⋮ |

PBX200 OFFICE

| | EXTENSION NO. | RT-ID | RC-ID | OFFICE NO. |
|---|---|---|---|---|
| HOME AREA | 4111 | 0211 | 0210 | — |
| | 4112 | — | — | — |
| | ⋮ | ⋮ | ⋮ | ⋮ |
| VISITOR AREA | 5111 | — | — | — |
| | 5112 | — | — | — |
| | ⋮ | ⋮ | ⋮ | ⋮ |

PBX300 OFFICE

| | EXTENSION NO. | RT-ID | RC-ID | OFFICE NO. |
|---|---|---|---|---|
| HOME AREA | 6111 | 0311 | 0310 | — |
| | 6112 | — | — | — |
| | ⋮ | ⋮ | ⋮ | ⋮ |
| VISITOR AREA | 7111 | 0112 | 0310 | 100 |
| | 7112 | — | — | — |
| | ⋮ | ⋮ | ⋮ | ⋮ |

| RT-ID | RT TELEPHONE NO. | HOME OFFICE NO. | SERVICE CLASS | OFFICE LINE CALL ORIGINATING ENABLE/DISABLE |
|---|---|---|---|---|
| 0111 | 2111 | 100 | CL 1 | ENABLE |
| 0112 | 2112 | 100 | CL 1 | ENABLE |
| ⋮ | ⋮ | ⋮ | ⋮ | ⋮ |
| 0211 | 4111 | 200 | CL 1 | ENABLE |
| ⋮ | ⋮ | ⋮ | ⋮ | ⋮ |
| 0311 | 6111 | 300 | CL 1 | ENABLE |
| ⋮ | ⋮ | ⋮ | ⋮ | ⋮ |

FIG. 7(a)

MOVEMENT REGISTRATION REQUEST SIGNAL/TERMINAL MOVEMENT NOTIFICATION SIGNAL

FIG. 7(b)

MOVEMENT REGISTRATION SUCCESS SIGNAL/ANSWER SIGNAL

FIG. 9
PRIOR ART

PRIVATE RADIO SYSTEM FOR DELIVERING INCOMING CALLS TO A MOBILE SUBSCRIBER

BACKGROUND OF THE INVENTION

1. Field of the Invention

This invention relates to mobile radio telephones and a private network system in which a plurality of private branch exchanges (PBXs), each switching the mobile radio telephones, are installed so as to enable originating connection of one exchange and terminating connection of another exchange in the office area of the PBX if a single mobile radio telephone is moved to any PBX in the private network.

2. Description of Related Art

Figure 9:
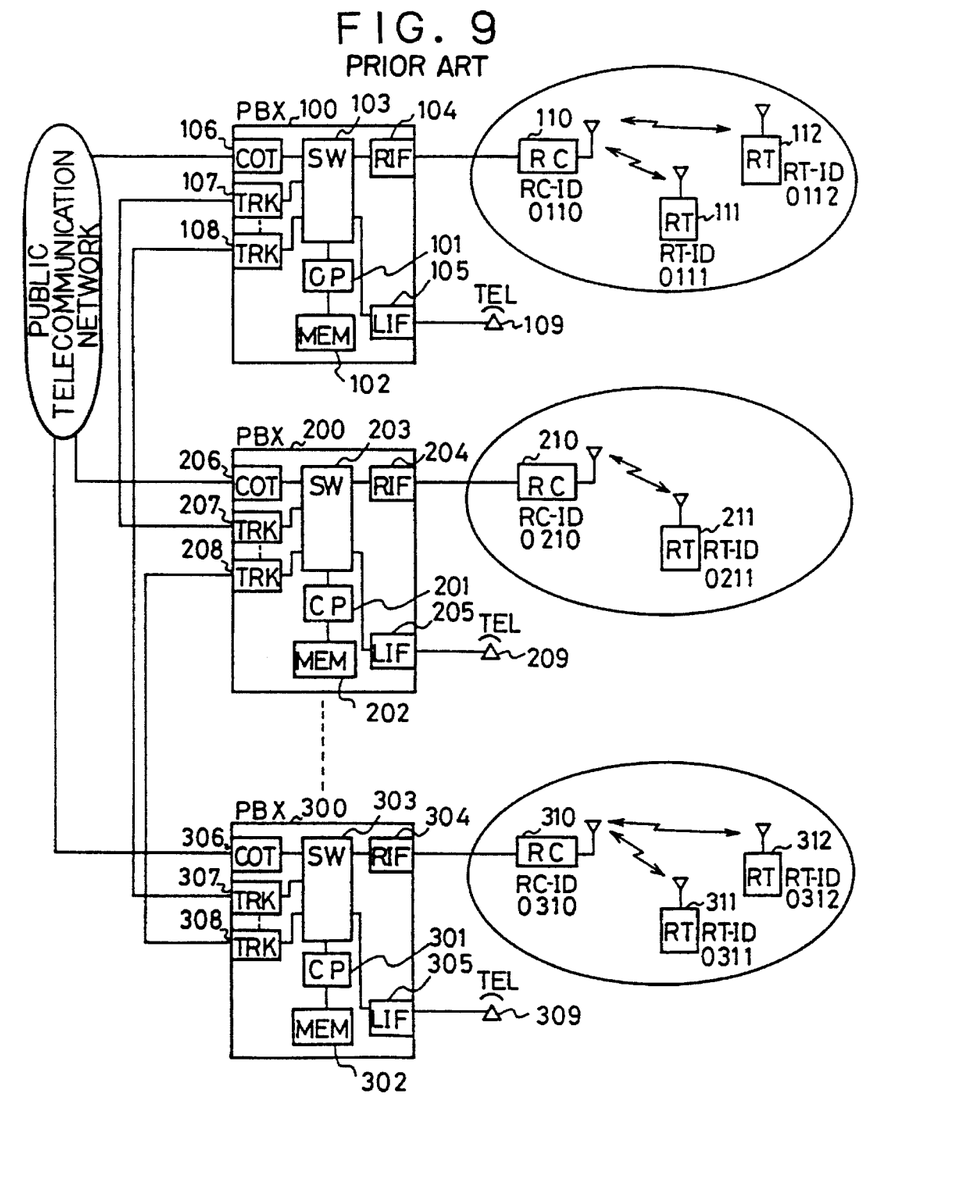
FIG. 9 shows the configuration of a conventional private network system.

FIG. 9 shows the configuration of a conventional radio telephone switching system in which a plurality of private branch exchanges (PBXs) are installed for connection to each other as an in-house network. In FIG. 9, PBX100 includes one or more radio connection controllers RC110, one or more radio termination interfaces RIF104, one or more ordinary telephones TEL109, one or more ordinary telephone terminal interfaces LIF105, one or more public telecommunication network interfaces COT106, and one or more in-house network interfaces TRK107 and TRK108. Further, the PBX100 includes a speech path switch SW103, a central controller or central processor CP101, and a memory MEM102. The switch SW103 is controlled by the central processor CP101. Data required for the central processor CP101 to control connection is stored in the memory MEM102. Other private branch exchanges PBX200 and PBX300 are of the same configuration.

In FIG. 9, the public telecommunication network interface COT106 is an interface for communication via a public telecommunication network and the in-house network interfaces TRK107 and TRK108 are interfaces with PBX200 and PBX300 respectively. The ordinary telephone TEL109, mobile radio telephones, etc., are assigned numbers indicating their respective identification codes and the correspondence between the identification codes and the interfaces through which the telephones having the identification codes are connected to the PBX100 are previously stored in the memory MEM102 of the PBX100.

In FIG. 9, in addition to the ordinary telephone TEL109, mobile radio telephones such as RT111 and RT112 can be connected via the radio connection controller RC110 and the radio termination interface RIF104 to the PBX100 for switching. When receiving a radio signal from a mobile radio telephone, the radio connection controller RC110 sends it via the radio termination interface RIF104 to the PBX100; when receiving a call signal from the PBX100, the radio connection controller RC110 converts it into a radio signal and sends the resultant signal to the corresponding mobile radio telephone. The radio connection controller and mobile radio telephones can communicate with each other at specific frequencies within the PBX service area. Their respective power is defined to reach in a predetermined range, for example, within 100 m, and each mobile radio telephone communicates with a near radio connection controller within the service area. For the PBX100 to perform radio connection control, it is necessary to manage which radio connection controller RC each mobile radio telephone RT is positioned near. This is referred to as position registration management. The position registration management registers and updates information as to which radio connection controller RC each mobile radio telephone RT is positioned near within the PBX. The mobile radio telephones are managed in the home office which is one of PBXs (in this case, PBX100). In the conventional system example given above, each mobile radio telephone can be combined with any desired radio connection controller for connection within the specific PBX. Thus, although a mobile radio telephone is moved anywhere, if a radio connection controller is located near the mobile radio telephone, the radio connection controller can be used for originating connection and terminating connection. That is, the positional relationships between the mobile radio telephones and radio connection controllers are registered for management in the home office to enable originating connection and terminating connection.

However, since only registration of the positional relationships within the single PBX is managed in the conventional system example given above, originating connection and termination connection cannot be made if mobile radio telephones are moved to the service area of a PBX other than the PBX where the positional relationships are registered. That is, information on movement of the mobile radio telephones is not transferred between the PBXs and thus the mobile radio telephones can be used only within the service area of the home office.

SUMMARY OF THE INVENTION

Accordingly, it is an object of the invention to provide a private network system and mobile radio telephones so as to enable originating connection of one exchange and terminating connection of another exchange even if any of the mobile radio telephones is moved from the PBX where the position of the mobile radio telephone is registered to a different PBX.

To this end, according to one embodiment of the invention, there is provided a private network system which comprises a plurality of PBXs for switching telephones, a plurality of mobile radio telephones being assigned to at least one of the PBXs as a home office in which positions of the mobile radio telephones are registered for radio communication, and one or more radio connection controllers connected to any one of the PBXs for radio communicating with the mobile radio telephones wherein:

each of the PBXs has registration means for recording identification codes of the radio connection controllers with which the mobile radio telephones can communicate;

each of the radio connection controllers outputs to the mobile radio telephones periodically a position registration instruction request signal to which the identification code of the radio connection controller is added;

each of the mobile radio telephones has record means for recording the identification code of a radio connection controller with which the mobile radio telephone can communicate, comparison means for comparing the identification code of the radio connection controller contained in the position registration instruction request signal with the identification code of the radio connection controller previously registered in the record means to see if they match, and position registration request signal output means, if they do not match, for outputting to the PBX a position registration request signal to which the identification code of the radio connection controller contained in the position registration instruction request signal and the identification code of the mobile radio telephone are added; the record means for updating the radio connection controller identification code if they do not match;

each of the PBXs has determination means responsive to the position registration request signal for determining whether or not the home office of the mobile radio telephone outputting the signal is the PBX; and if position registration is requested by the mobile radio telephone whose home office is the PBX, the registration means of the PBX updates the identification code of the corresponding radio connection controller and if the mobile radio telephone is a visitor whose home office is not the PBX, the registration means records the identification codes of the radio connection controller and the mobile radio telephone.

Each of the PBXs in the private network system has terminal movement notification signal output means, if the mobile radio telephone is a visitor whose home office is not the PBX, the output means for outputting a terminal movement notification signal to which the identification codes of the mobile radio telephone and the PBX are added, to another PBX; wherein if the identification code of the mobile radio telephone contained in a terminal movement notification signal from a different PBX is the identification code of a mobile radio telephone whose home office is the PBX receiving the signal, the registration means of the PBX records the identification code of the different PBX contained in the signal as a visitor office; and each of the PBXs further includes transfer means, if a terminating call comes in, the transfer means for referring to the registration means, and if the identification code of another PBX is registered for the mobile radio telephone for which the terminating call is destined, for transferring the same to the visitor office.

Each of the PBXs in the private network system can be responsive to a terminal movement notification signal from a visitor office for returning an answer signal to which identification code information of the PBX is added to the visitor office if the terminal movement notification signal contains the identification code of a mobile radio telephone whose home office is the PBX.

The registration means of each of the PBXs in the private network system may have a position registration management table which consists of a home office area for registering positions of mobile radio telephones whose home office is the PBX and a visitor office area for registering positions of visitor mobile radio telephones whose home office is not the PBX.

The private network system may contain a database memory which stores the identification codes and home office numbers of the radio connection controllers with which the mobile radio telephones can communicate for every radio telephone wherein the registration means of each of the PBXs can be responsive to the position registration request signal of each mobile radio telephone; if the mobile radio telephone is a visitor whose home office is not the PBX, the registration means can refer to the database memory to obtain the identification code of the PBX of the home office of the mobile radio telephone for recording the identification code of the PBX of the home office, that of the radio connection controller, and that of the mobile radio telephone.

Each of the PBXs in the private network system has terminal movement notification signal output means, if the mobile radio telephone is a visitor whose home office is not the PBX, the means for outputting a terminal movement notification signal to which the identification codes of the visitor mobile radio telephone and the PBX are added, to the PBX of the home office of the visitor mobile radio telephone; wherein if the identification code of the mobile radio telephone contained in a terminal movement notification signal from a different PBX is the identification code of a mobile radio telephone whose home office is the PBX receiving the signal, the registration means of the PBX records the identification code of the different PBX contained in the signal as a visitor office; and each of the PBXs further includes transfer means, if a terminating call comes in, the transfer means for referring to the registration means, and if the identification code of another PBX is registered for the mobile radio telephone for which the terminating call is destined, for transferring the same to the visitor office. The database memory in the private network system further stores at least one of information entries of a service class, call originating line or originating restricted line which is predetermined information in a home office of each mobile radio telephone, and the PBXs can refer to the database memory for performing control defined according to the service class. Each of the mobile radio telephones in the private network system includes input means for accepting an output instruction to the PBX, of a position registration request signal to which the identification code of the mobile radio telephone is added, and upon reception of the position registration request signal, the radio connection controller can add the identification code thereof to the request signal for transmission to the PBX.

The private network system can further include a common channel signal line for transferring movement information between the PBXs.

According to another embodiment of the invention, there is provided a private network system which comprises a plurality of PBXs for switching telephones, each of the PBXs including one or more radio connection controllers for radio communicating with mobile radio telephones, and a plurality of mobile radio telephones for radio communicating with the radio connection controller through which the mobile radio telephones are connected to the PBX wherein:

the radio connection controller has an area in which the controller can communicate with the mobile radio telephones;

each of the mobile radio telephones has detection means for detecting movement thereof from the area to a different area and position registration means, upon movement of the telephone to the different area, for reporting the position thereof to the home PBX through the radio connection controller; and each of the PBXs has determination means for determining whether or not a mobile radio telephone has moved from an area of a radio connection controller contained in a different PBX, movement notification means, upon movement of the mobile radio telephone from the area of the radio connection controller contained in the different PBX, for informing the different PBX that the mobile radio telephone has moved to the PBX, and transfer means, when a terminating call comes in for a mobile radio telephone which moves to a service area of a different PBX, for transferring the terminating call to the different PBX.

Each of the mobile radio telephones in the private network system may have input means, upon movement of the mobile radio telephone from an area of a radio connection controller contained in a different PBX, for accepting the identification code of the different PBX, and position registration means for reporting that the mobile radio telephone has moved together with the identification code for registering in the different PBX through the radio connection controller.

In the private network system, the registration means of each of the PBXs records the identification codes of the radio connection controllers with which the radio connection controllers can communicate.

Each of the radio connection controllers periodically outputs to the mobile radio telephones a position registration instruction request signal to which the identification code of the radio connection controller is added.

The record means of each of the mobile radio telephones records the identification code of a radio connection controller with which the mobile radio telephone can communicate, and the comparison means of the mobile radio telephone compares the identification code of a radio connection controller contained in a position registration instruction request signal with the identification code of the radio connection controller previously registered in the record means to see if they match. If they do not match, the position registration request signal output means of the mobile radio telephone outputs to the exchange a position registration request signal to which the identification code of the radio connection controller contained in the position registration instruction request signal and the identification code of the mobile radio telephone are added. If they do not match, the record means updates the radio connection controller identification code.

The determination means of each of the PBXs is responsive to the position registration request signal for determining whether or not the home office of the mobile radio telephone outputting the signal is the PBX, and if position registration is requested by the mobile radio telephone whose home office is the PBX, the registration means of the PBX updates the identification code of the corresponding radio connection controller and if the mobile radio telephone is a visitor whose home office is not the PBX, the registration means records the identification codes of the radio connection controller and the mobile radio telephone.

DESCRIPTION OF THE PREFERRED EMBODIMENT

Figure 1:
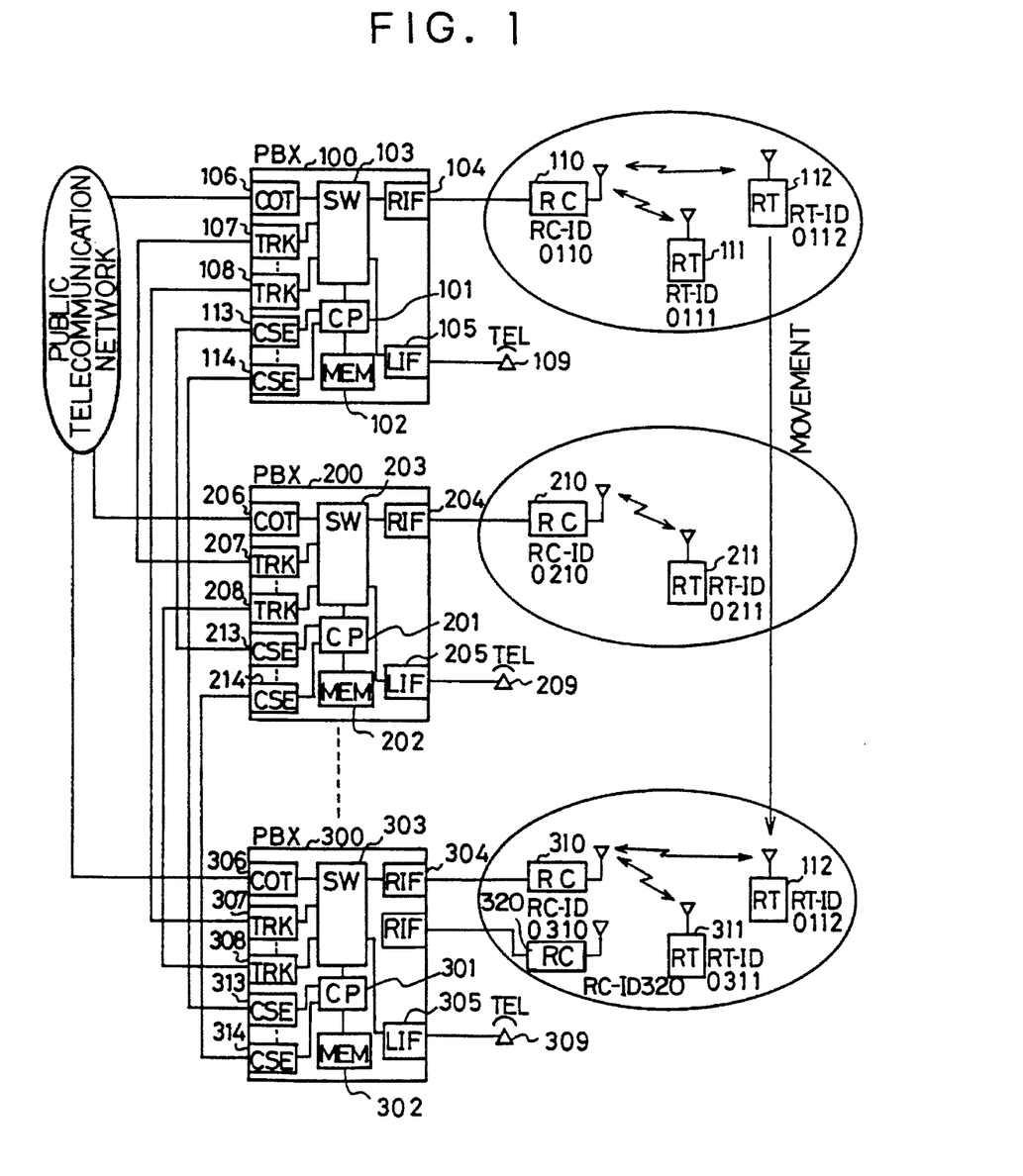
FIG. 1 is a private network system configuration diagram.

Referring now to FIGS. 1 to 8 of the accompanying drawings, there is shown one embodiment for carrying out the invention. FIG. 1 shows the system configuration in which a plurality of private branch exchanges (PBXs) are installed for connection to each other as an in-house network. In FIG. 1, PBX100 includes one or more radio connection controllers RC110, one or more radio termination interfaces RIF104, one or more ordinary telephones TEL109, one or more ordinary telephone terminal interfaces LIF105, one or more public telecommunication network interfaces COT106, one or more in-house network interfaces TRK107 and TRK108, and one or more common channel signal line units CSE113 and CSE114. Further, the PBX100 includes a speech path switch SW103, a central controller or central processor CP101, and a memory MEM102. The switch SW103 is controlled by the central processor CP101. Data required for the central processor CP101 to control connection is stored in the memory MEM102. Other private branch exchanges PBX200 and PBX300 are of the same configuration.

In FIG. 1, the public telecommunication network interface COT106 is an interface for communication via a public telecommunication network, although a plurality of the interfaces can be provided. The in-house network interfaces TRK107 and TRK108 are interfaces with PBX200 and PBX300 respectively, and a plurality of the TRK107 interfaces and the TRK108 interfaces can be provided. The common channel signal line units CSE113 and CSE114 are interfaces for connection of common channel signal lines to the PBX200 and PBX300 respectively apart from the speaking lines, and a plurality of the CSE113 interfaces and the CSE114 interfaces can be provided. The ordinary telephone TEL109, mobile radio telephones, etc., are assigned numbers indicating their respective identification numbers (or identification codes) and the correspondence between the identification numbers and the interfaces through which the telephones having the identification codes are connected to the PBX100 is previously stored in the memory MEM102 of the PBX100.

In FIG. 1, in addition to the ordinary telephone TEL109, mobile radio telephones such as RT111 and RT112 can be connected via the radio connection controller RC110 and the radio termination interface RIF104 to the PBX100 for exchange. When receiving a radio signal from a mobile radio telephone, the radio connection controller RC110 sends it via the radio termination interface RIF104 to the PBX100; when receiving a call signal from the PBX100, the radio connection controller RC110 converts it into a radio signal and sends the resultant signal to the corresponding mobile radio telephone. The radio connection controller and mobile radio telephones can communicate with each other at specific frequencies within the PBX service area. Their respective power is defined to reach in a predetermined range, for example, within 100 m, and each mobile radio telephone communicates with a nearby radio connection controller within the service area.

Figure 2:
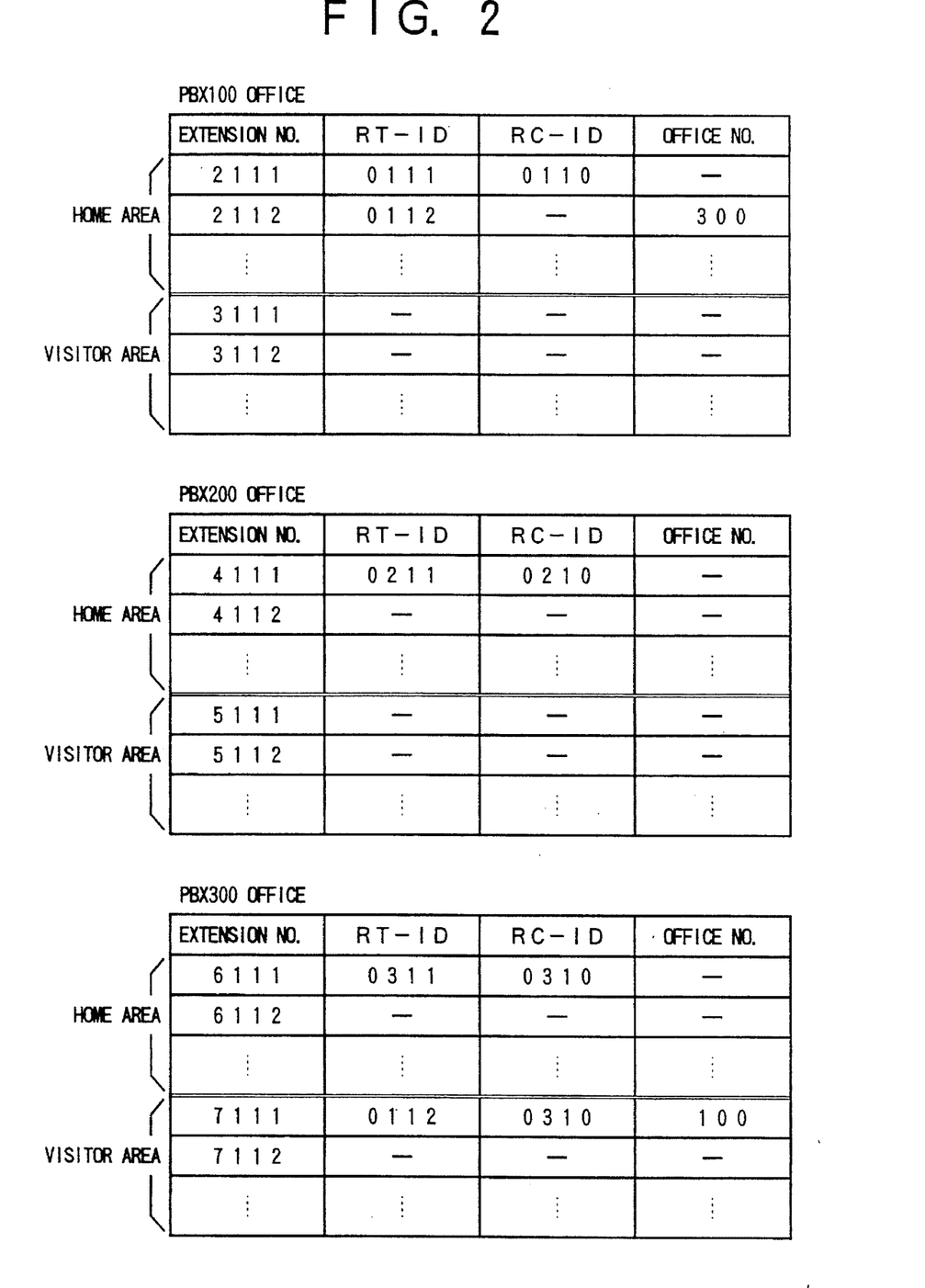
FIG. 2 shows the format of position registration management tables in the private network system.

For the PBX100 to perform radio connection control, it is necessary to manage which radio connection controller RC each mobile radio telephone RT is positioned near. This is referred to as position registration management. The position registration management uses registration means contained in the PBX for registering and updating information as to which radio connection controller RC each mobile radio telephone RT is positioned near. FIG. 2 shows the format of position registration management tables stored in a memory area that the registration means in the PBX has, wherein stored for each mobile radio telephone are the extension number, the identification number of the mobile radio telephone RT (RT-ID), the identification number of the associated radio connection controller RC (RC-ID), and the office number. The extension numbers and RT-IDs have a one-to-one correspondence. The RT-IDs and RC-IDs have a one-to-one correspondence in FIG. 2, but have a b 1- to-n correspondence normally and indicate the radio connection controllers RCs available with the specific mobile radio telephone RT. The office number information means the PBX identification number indicating which office (PBX) the mobile radio telephone RT is being moved to or has been moved from when a mobile radio telephone RT is moving to another PBX. When it does not move, no data may be registered as shown in FIG. 2, or the home PBX number may be registered. The table consists of two areas: A home area for indicating information on the mobile radio telephones RTs which belongs to the home PBX and a visitor area for temporarily storing information on the mobile radio telephones RTs moved from other PBXs. The table size for the home area is determined from the maximum number of the mobile radio telephones RTs that the home PBX accommodates, and that for the visitor area can be made a proper size according to the number of the visitor mobile radio telephones RTs. The extension numbers of the mobile radio telephones in the visitor area are predetermined and when a mobile radio telephone moves to another PBX, the extension number in the visitor area is temporarily related to the RT-ID of the mobile radio telephone.

FIG. 2 shows an example of the position registration management tables for the PBX100, PBX200, and PBX300 offices shown in FIG. 1, wherein the situation in which the mobile radio telephone RT112 moves from the home office 100 to visitor office 300 is shown together with other mobile radio telephones RT111, RT211, and RT311. The table of the PBX100 office shows that the mobile radio telephones RT111 and RT112 are accommodated as home RTs, that the mobile radio telephone RT111 stays in the home office and is positioned near the radio connection controller RC110, and that the mobile radio telephone RT112 is operating and PBX300 is the office to which the RT112 moves. At present, the PBX100 office does not contain any mobile radio telephone RT moved in from other offices. The table of the PBX200 office shows that the mobile radio telephones RT211 is accommodated as a home RT and that the mobile radio telephone RT211 stays in the home office and is positioned near the radio connection controller RC210. At present, the PBX200 office does not contain any mobile radio telephone RT moved in from other offices. The table of the PBX300 office shows that the mobile radio telephones RT311 is accommodated as a home RT, that the mobile radio telephone RT311 stays in the home office and is positioned near the radio connection controller RC310, and that the mobile radio telephone RT112 is moved from another office (PBX100) and is positioned near the radio connection controller RC310. Whenever a mobile radio telephone RT moves, its corresponding radio connection controller RC is updated in the position registration management tables. Thus, position registration of the mobile radio telephones RTs moved from other PBXs can be managed as visitors by dividing each position registration management table into home and visitor areas.

Which radio connection controller RC each mobile radio telephone RT is positioned near can also be registered in the table.

Two types of position registration management are available: automatic and manual which can normally be used in combination.

For automatic position registration, a radio telephone has record means for recording the identification code of a radio connection controller to which the radio telephone can be connected, comparison means for comparing the identification code of a radio connection controller indicated by a position registration instruction request signal with the identification code of the radio connection controller previously registered in the record means to see if they match, and position registration request signal output means, if they do not match, for outputting to the PBX a position registration request signal to which the identification code of the radio connection controller indicated by the position registration instruction request signal and the identification code of the radio telephone are added, the record means being capable of updating the radio connection controller identification code if they do not match.

In the automatic position registration, a radio connection controller RC sends a position registration instruction request signal to each mobile radio telephone RT within the home service area at regular intervals, such as every three to five minutes. The position registration instruction request signal is given radio connection controller RC information (RC-ID) indicating the predetermined identification number of the radio connection controller RC. Each mobile radio telephone RT has record means where radio connection controller RC information is previously registered as position registration data. The office number of the home office may also be previously registered in the record means of each mobile radio telephone RT. When receiving the instruction request signal, the comparison means of the mobile radio telephone RT compares the radio connection controller RC information previously registered in the mobile radio telephone RT with the radio connection controller RC information contained in the instruction request signal. The latter RC information is registered intact if no radio connection controller RC information is previously registered; the former RC information remains unchanged if they match. If the comparison result indicates that the radio connection controller RC sending the instruction request signal differs from the registered RC, the mobile radio telephone RT updates the position registration data stored in its own record means to the new radio connection controller RC information. At the same time, the position registration request signal output means of the mobile radio telephone RT sends a position registration request signal through the radio connection controller RC to the PBX so as to update the data stored in the PBX.

Each mobile radio telephone RT has a position registration button as input means for accepting a manual position registration instruction. In the manual position registration, when a mobile radio telephone RT accepts a position registration instruction on the position registration button as required, for example, when the RT is moved, a position registration request signal is transmitted to the radio connection controller RC near the RT. The identification number of the RT (RT-ID) is added to the position registration request signal. When receiving the request signal via the radio connection controller RC, the PBX updates the identification number of the RT (RT-ID) and the identification number of the RC (RC-ID) through which the signal has been transmitted as position registration data of the RT.

Figure 3:
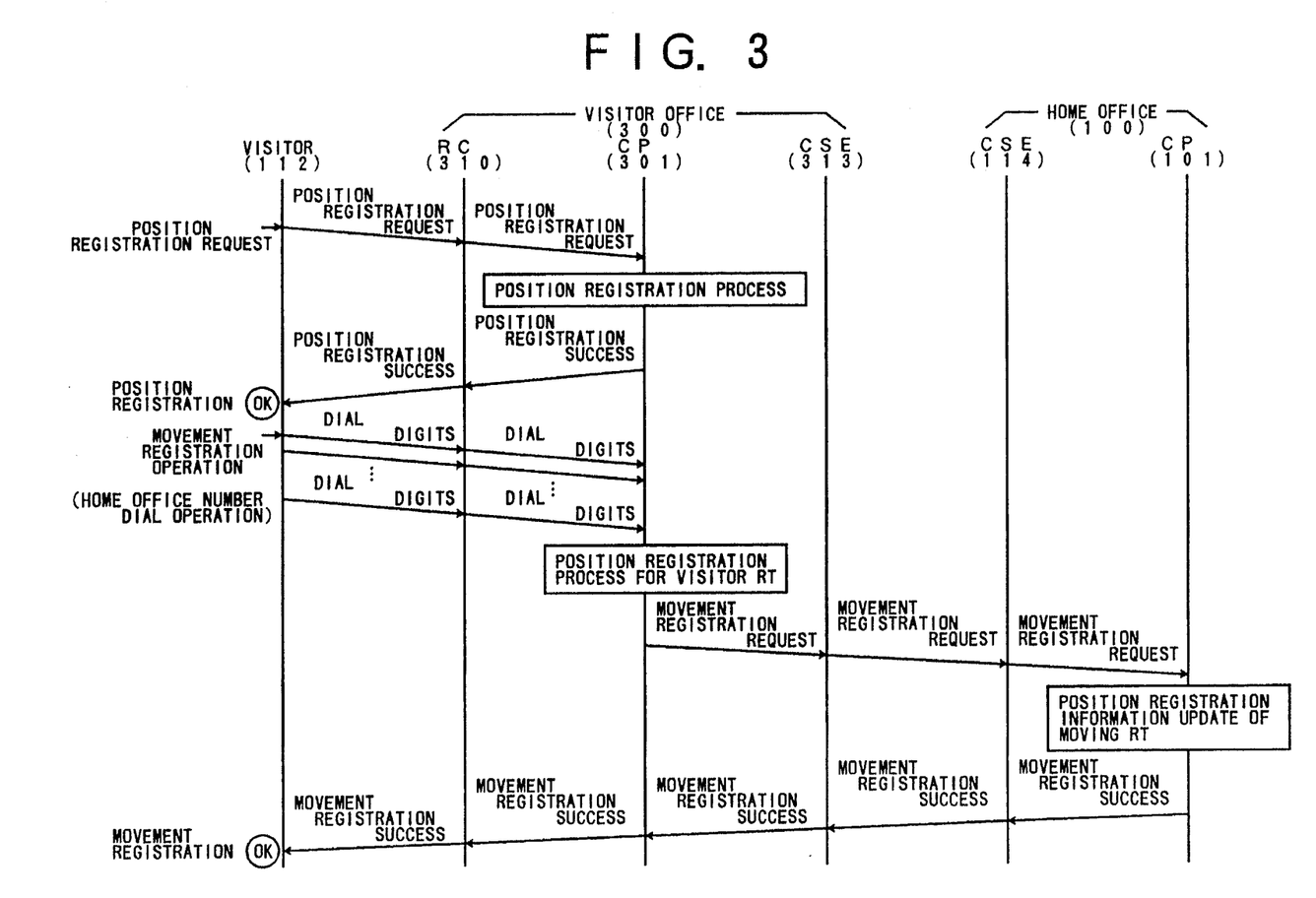
FIG. 3 shows an operation sequence in a first example for updating the position registration management table.

FIG. 3 shows an operation sequence for updating the position registration management tables when a mobile radio telephone RT moves from one office to another. The example shown in FIG. 3 indicates an operation sequence for position registration when the mobile radio telephone RT112 moves from the PBX100 office to the PBX300 office. In this example, each PBX has registration means for recording the identification code of a radio connection controller with which the mobile radio telephone can communicate and determination means responsive to a position registration request signal from the mobile radio telephone for determining whether or not the home office of the mobile radio telephone is the PBX. If the position registration is requested by the mobile radio telephone whose home office is the PBX, the registration means updates the identification code of the corresponding radio connection controller. If the mobile radio telephone is a visitor whose home office is not the PBX, the registration means records the identification codes of the radio connection controller and the mobile radio telephone. Each PBX has terminal movement notification signal output means, if the mobile radio telephone is a visitor whose home office is not the PBX, for outputting a terminal movement notification signal to which the identification codes of the mobile radio telephone and the PBX are added, to another PBX. If the identification code of the mobile radio telephone contained in a terminal movement notification signal from another PBX is that of a mobile radio telephone whose home office is the PBX receiving the signal, the registration means of this PBX records the identification code of the different PBX contained in the signal as a visitor office. Each PBX further includes transfer means, if a terminating call comes in, for referring to the registration means, and if the identification code of another PBX is registered for the mobile radio telephone for which the terminating call is destined, for transferring the terminating call to the visitor office.

Now, the operation sequence shown in FIG. 3 is described. The mobile radio telephone RT112 registers its position in the visitor office 300 to which the RT112 moves by executing the automatic or manual position registration described above. That is, the RT112 uses the position registration request signal output means for outputting a position registration request signal to which the RT-ID of the RT112 is added. The PBX receives the position registration request signal through the nearest radio connection controller RC, and the determination means determines whether or not the RT112 sending the signal is a radio telephone whose home office is the PBX. If the position registration is requested by the radio telephone whose home office is the PBX, the registration means updates the identification code of the corresponding radio connection controller to that of the nearest RC. If the RT is a visitor radio telephone whose home office is not the PBX, the registration means records the RT-ID and RC-ID in the visitor area of the position registration management table of the PBX. Upon termination of the data registration, the PBX sends a position registration success signal. When receiving this signal, the RT112 sends a dial digit signal of "special number and home office number" previously registered to the PBX in order to inform it as to which office the RT112 has been moved from. If the number is not registered in the RT112, the dial digits entered by the user may be accepted and sent. When the visitor office 300 receives the dial digit signal, the office number of the home office and available RC-ID information corresponding to the RT-ID of the RT112 are registered in the visitor area of the position registration management table for the RT112. Further, the movement registration request signal output means of the visitor office 300 sends the RT-ID and office number information "300" as a "movement registration request signal" to the home office 100 on the common channel signal line to inform the home office that the RT112 is operating in the PBX300 service area. When the home office 100 receives the signal, the office number information "300" indicating the RT112 destination is registered in the office number column for the RT112 in the position registration management table. Upon completion of the data update processing for movement registration, the home office 100 transmits a "movement registration success" signal to the visitor office 300. The PBX300 sends the received "movement registration success" signal intact to the RT112. When receiving this signal, the RT112 can inform the user of movement registration success by outputting an audible sound or visible indication. After this, the user can use the RT112 for originating a call and receiving an incoming call in the visitor office. According to the embodiment, the RT position is registered in the visitor office and further the office number of the visitor office is reported, thus even if the corresponding radio connection controller RC is changed, only position registration needs to be made in the visitor office and the home office need not be informed if the RT lies within the visitor office service area.

Figure 7A:
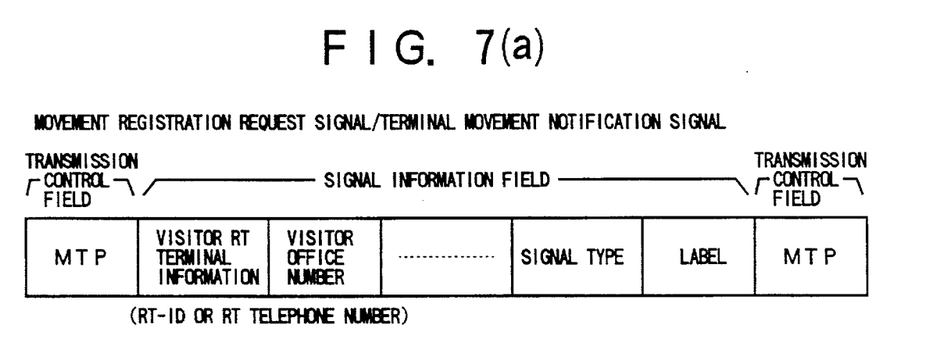
FIG. 7 shows the signal unit format on a common channel signal line.
Figure 7B:
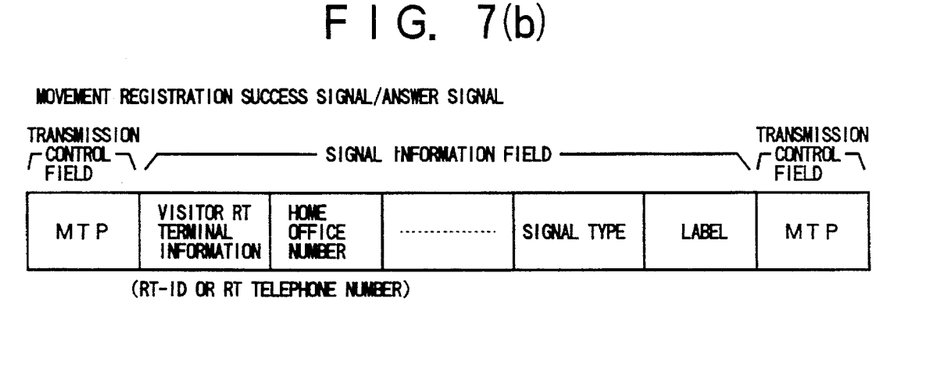

FIG. 7 shows the formats of data transferred between visitor and home offices on the common channel signal line. Control information can be transferred between PBXs as necessary or on all occasions. The data format consists of transmission control fields and a signal information field as shown in FIG. 7. The signal information field is divided into more than one area indicating visitor RT terminal information (RT-ID or RT telephone number) and visitor office number information, a signal type area, and a label area. When the visitor RT position registration processing described above is performed, the corresponding identification number is inserted in the area indicating the visitor RT terminal information (RT-ID or RT telephone number) and visitor office number information and the predetermined signal type indicating a terminal movement notification signal is added for transmission, as shown in FIG. 7 (a). As an answer signal, the corresponding identification number is inserted in the area indicating the visitor RT terminal information (RT-ID or RT telephone number) and home office number information and the predetermined signal type indicating an answer signal is added for transmission, as shown in FIG. 7 (b).

Figure 4:
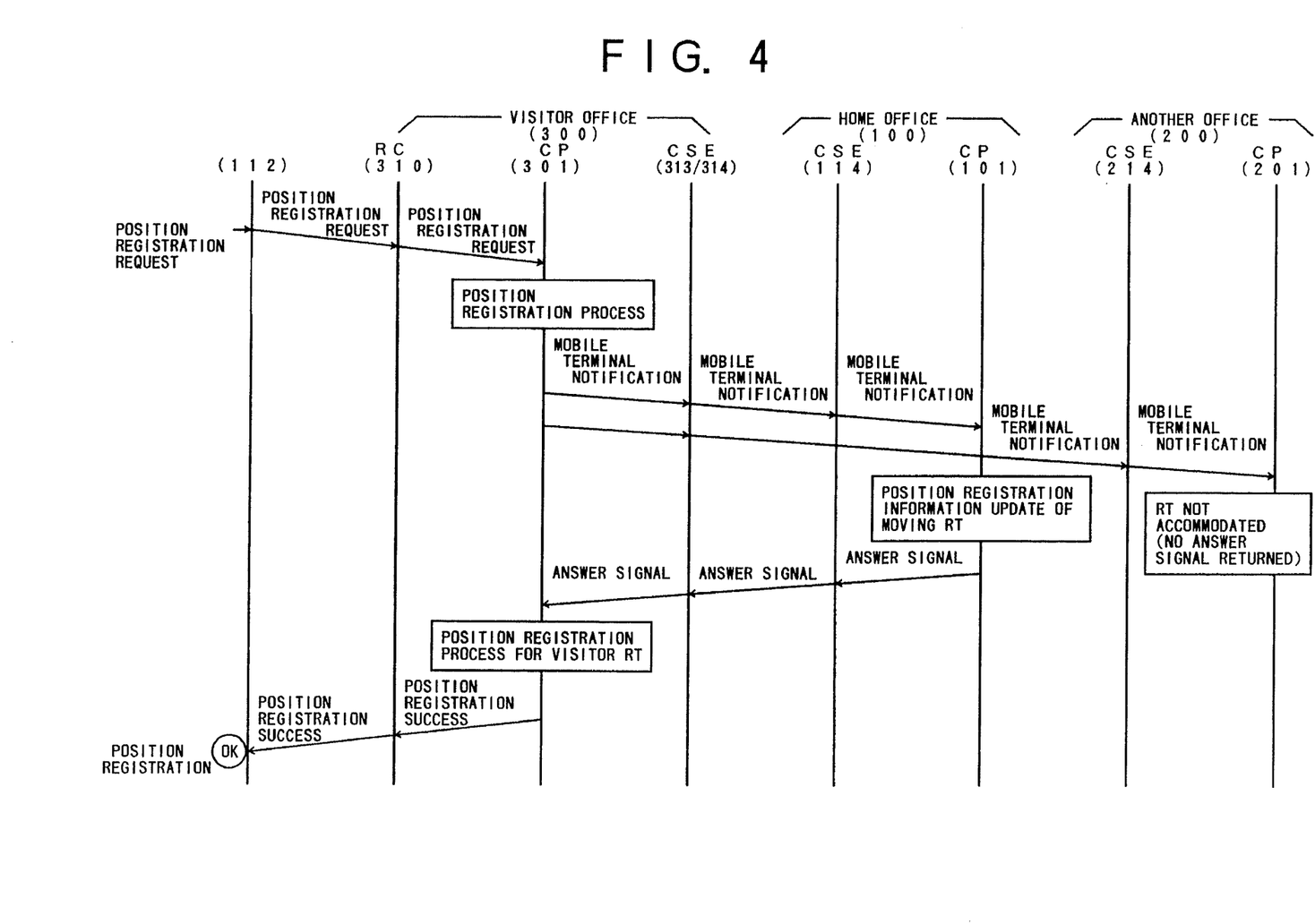
FIG. 4 shows an operation sequence in a second example for updating the position registration management table.

In the operation of the private network system according to the embodiment described above, the "special number+ home office number" is previously registered for transmission as means for providing home office number information when the mobile radio telephone RT moves to the visitor office. As an alternative, FIG. 4 shows a second example of a position registration operation sequence, wherein office number information of a home office is not previously extracted from each mobile radio telephone RT in visitor offices and when receiving a position registration request from a mobile radio telephone RT not accommodated in the office (visitor RT), the visitor office can transmit a "terminal movement notification signal" to which the identification code of the mobile radio telephone RT (RT-ID) and the office number information of the visitor office are added over the common channel signal line to all PBXs in the network to inform that the RT moves to the office. In this case, each office receiving the signal determines whether or not the RT belongs to the office from the identification code of the RT, and if the RT belongs to the office, the home office returns a signal with home office number information as an "answer signal" to the visitor office; other offices receiving the "terminal movement notification signal" may transmit a no answer signal.

According to the second embodiment described above, other offices than the home office do not respond to the "terminal movement notification signal" with an answer signal, thus the visitor office can recognize from the home office number information the office from which the RT has moved, in response to which the office number information in the position registration management tables of the visitor and home offices can also be updated.

Figure 6:
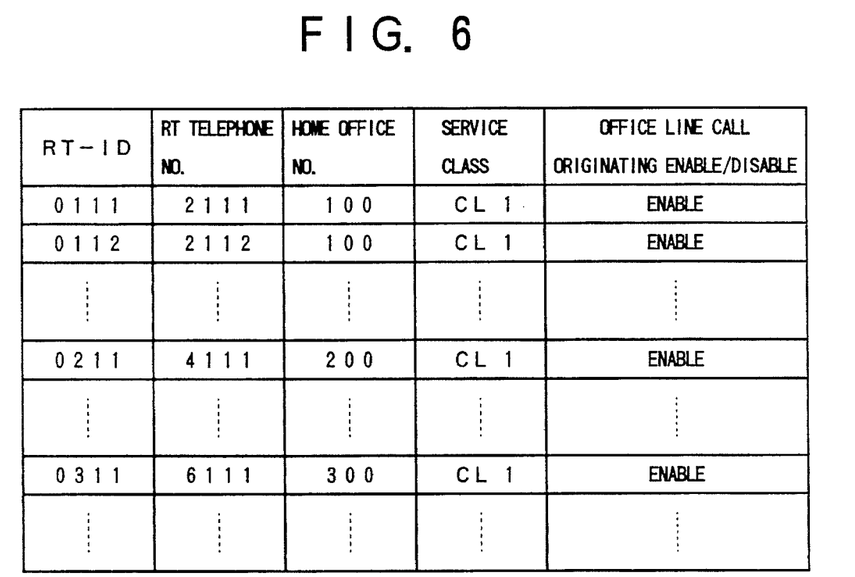
FIG. 6 shows the memory format for a data base.

Further, as a third embodiment, a data base which stores the office numbers of the offices to which all mobile radio telephones RTs in the network belong can be provided for each PBX or common to all PBXs. FIG. 6 shows a memory format example for the data base. As shown here, for each mobile radio telephone RT, the RT-ID, the telephone number of the RT, the home office number, the service class, and whether or not office line call originating to the outside of the private network is enabled are registered in the data base memory. The data base memory includes a memory which stores data and a controller which controls an access from each exchange.

Figure 5:
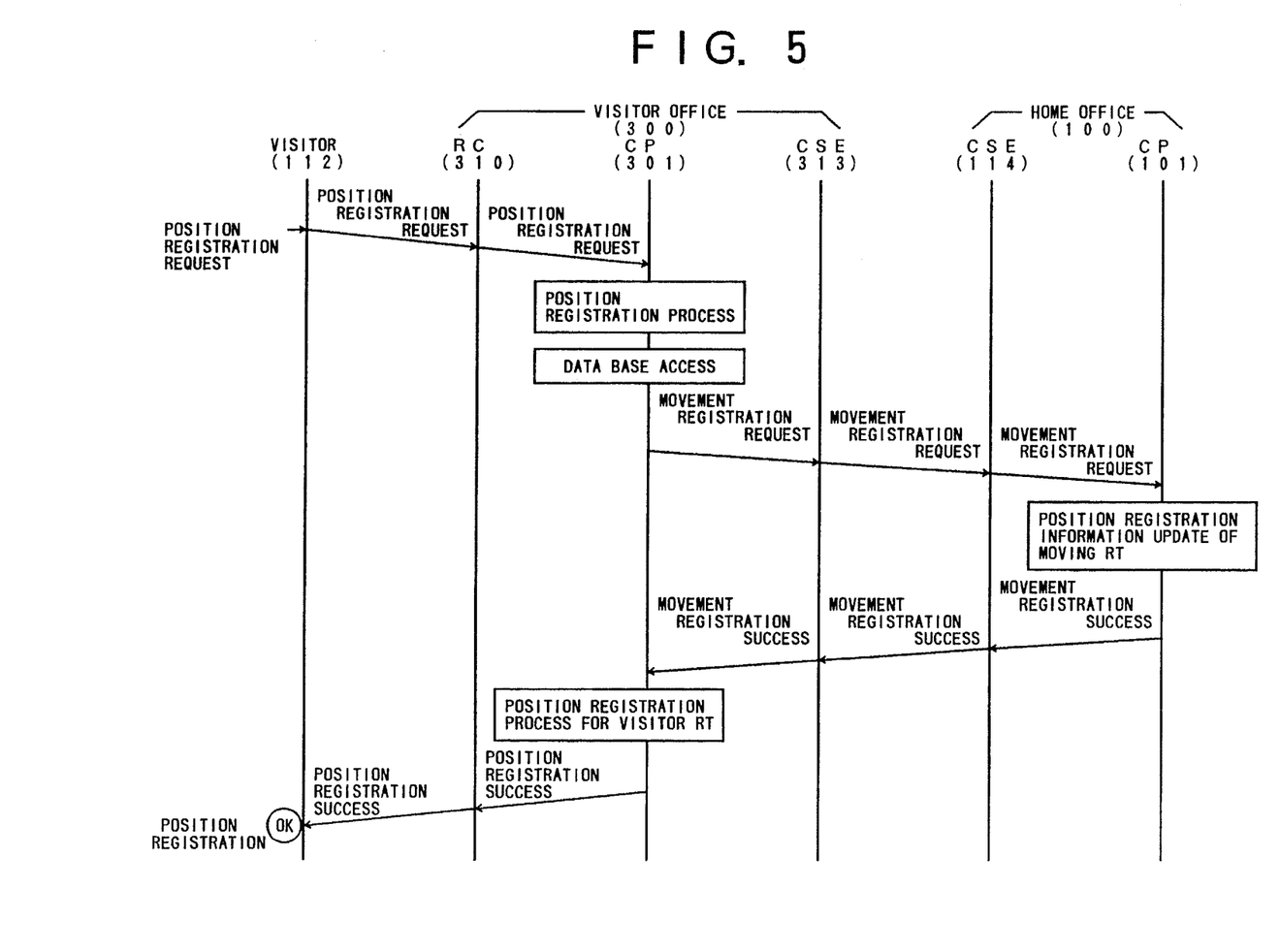
FIG. 5 shows an operation sequence in a third example for updating the position registration management table.

FIG. 5 shows an operation sequence of position registration operation when the database is provided. As shown here, when a visitor office receives a position registration request from a mobile radio telephone RT not accommodated in the office, the database can be accessed with the identification code of the visitor RT (RT-ID) as a key to retrieve data for outputting the home office number of the RT and the office number information in the position registration management tables of the visitor and home offices can be updated in response to the home office number information. The example shown in FIG. 5 assumes that the database is installed in the memory MEM102 of each PBX.

The database is provided with other information on each mobile radio telephone RT such as the service regulation class in the home office of the RT and enable or disable status of direct office line call originating in a visitor office as well as the home office number information so that connection control can be performed based on the data in the database when the RT moves to a visitor office and receives originating connection service and terminating connection service in the visitor office.

Figure 8:
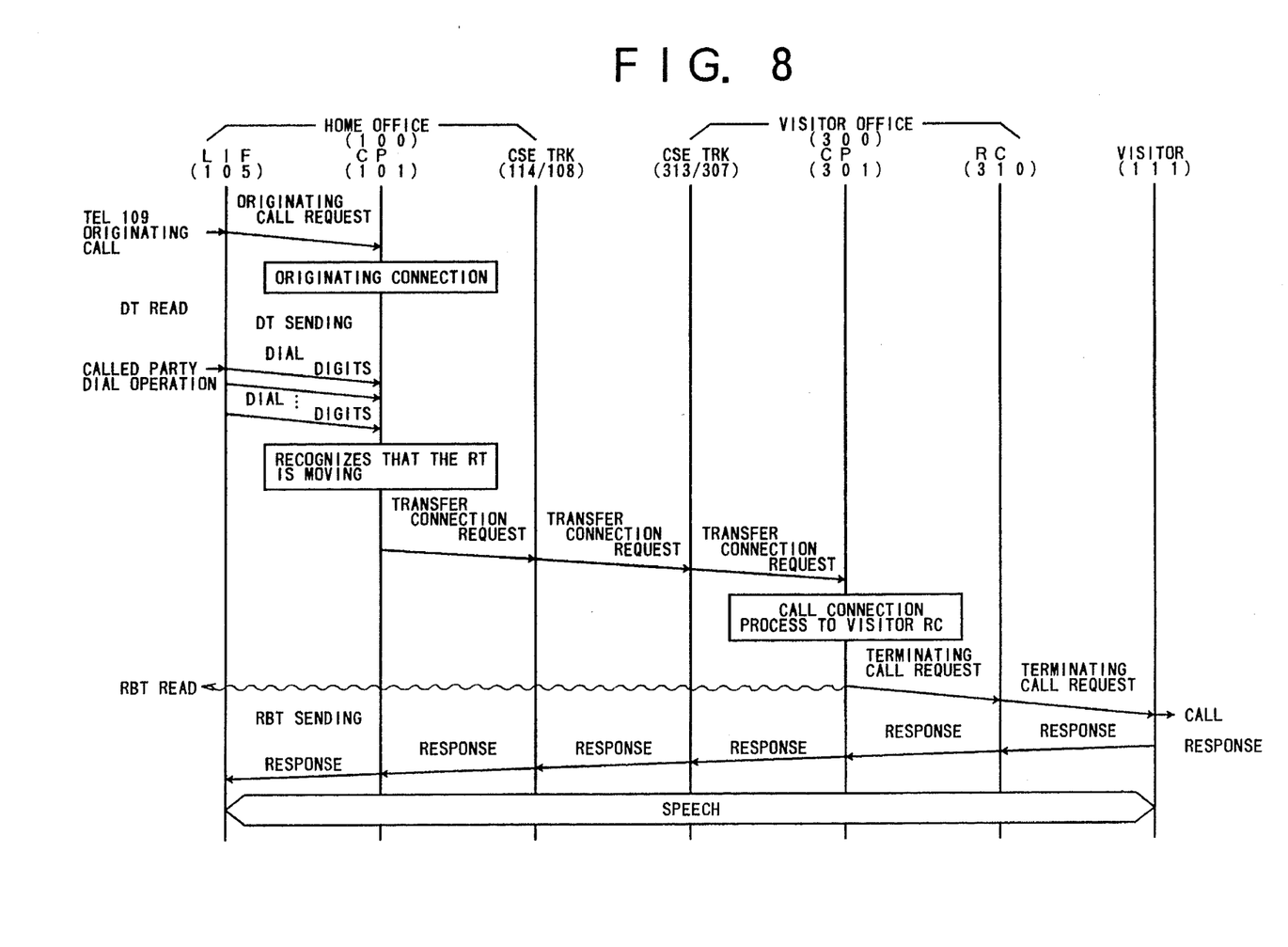
FIG. 8 shows a connection operation sequence when a terminating call comes in from a moving RT.

Described below is operation where a mobile radio telephone RT moves to a visitor office and receives originating connection service and terminating connection service in the visitor office. FIG. 8 shows a connection operation sequence when a terminating call comes in a mobile radio telephone RT in a visitor office 300. In the example shown in FIG. 8, ordinary telephone TEL109 in PBX100 calls a mobile radio telephone RT111. After calling, the TEL109 sends the dial digits of the telephone number of the RT111. Then, the home office 100 recognizes from the position registration management table that the mobile radio telephone RT corresponding to the received telephone number is moving to PBX300. Central controller or central processor CP101 of the home station sends a "transfer connection request" signal to the visitor office 300 on the common channel signal line for extending connection of the call to the visitor office. The "transfer connection request" signal contains the RT-ID of the called mobile radio telephone RT and the visitor office number. When receiving the signal, the visitor office 300 recognizes that it indicates a terminating call destined for the visitor mobile radio telephone RT111, and central controller or central processor CP301 of the visitor office calls the RT111. If the RT111 responds to the call, a "response" signal is returned via the visitor office and the home office to ordinary telephone terminal interface LIF105 and speech can be started between the TEL109 and the RT111.

According to the embodiment, if a terminating call comes in, it is transferred to the visitor office to which the called mobile radio telephone RT moves, thus the telephone can be used without changing the telephone number.

For originating connection in a visitor office when a mobile radio telephone RT lies within the service area of the visitor office, basically as originating connection of the RT in the home office, the visitor office is called from the RT, then the dial digits of the telephone number of the associated party wishing to be communicated with are sent to the visitor office through which the RT is connected to the telephone corresponding to the telephone number. When a visitor mobile radio telephone RT makes an office line originating call to the outside of the private network, the call can be charged such as by counting billing data for each RT-ID in the visitor office or by charging the home office by making the call through the home office.

According to the invention, there is provided a mobile radio telephone which can receive originating and terminating connection services even if it moves to any PBX service area in the network.

Other different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A private network system, comprising:

at least a first exchange, a second exchange: and a third exchange for exchanging telephone calls, said first, second, and third exchanges being connected through a network;

a radio telephone, said first exchange being a home exchange of said radio telephone, said radio telephone including position registration request signal transmission means for transmitting a position registration request signal including an identification code of said radio telephone;

a first radio connection controller connected to said first exchange;

a second radio connection controller connected to said second exchange, said second radio connection controller transmits said position registration request signal, upon receipt of said position registration request signal from said radio telephone, to said second exchange;

said second exchange comprises:

second registration means for recording the identification code of said radio telephone and information indicating that said second exchange is a visitor exchange of said radio telephone, when said radio telephone is a visitor radio telephone of said second exchange, upon receipt of said position registration request signal through said second radio connection controller, and terminal movement notification signal transmission means for transmitting a terminal movement notification signal to said network with the identification code of said radio telephone and an identification code of said second exchange when the identification code of said radio telephone is registered in said second registration means;

said first exchange comprises:

first registration means for registering the identification code of said radio telephone with information that said first exchange is the home exchange of said radio telephone, and further registering an identification code of said second exchange as a visitor exchange in correspondence with the identification code of said radio telephone upon receipt of said terminal movement notification signal including the identification code of the said radio telephone and the identification of the said second exchange from said second exchange through said network in the case where the identification code of said radio telephone added in said terminal movement notification signal corresponds to the identification code of said radio telephone recorded in said first registration means and the information that said first exchange is the home exchange of said radio telephone has been recorded therein, visitor exchange registration determination means for determining whether the identification code of said second exchange has been registered or not as said visitor exchange in said first registration means in correspondence to said radio telephone by referring to said first registration means, upon receipt of an incoming call to said radio telephone, transfer means for transferring the incoming call to said second exchange when the identification code of said second exchange has been registered as a visitor exchange in correspondence to said radio telephone as a result of the determination by said visitor exchange registration determination means, and first connecting means for connecting the incoming call to said radio telephone through said first radio connection controller when the identification code of said second exchange has not been registered as a visitor exchange in correspondence to said radio telephone as a result of the determination by said visitor exchange registration determination means, and further that the identification code of said radio telephone has been recorded in said first registration means together with information that said first exchange is the home exchange of said radio telephone;

said second exchange further comprises:

second connecting means for connecting the incoming call to said radio telephone through said second radio connection controller, referring to said second registration means upon receipt of the incoming call transferred by said transfer means if the identification code of said radio telephone has been registered in said second registration means;

wherein said terminal movement notification signal transmission means transmits said terminal movement notification signal to said first and third exchanges through said network;

wherein said first exchange refers to said first registration means upon receipt of said terminal movement notification signals and transmits an answer signals including the identification code of said first exchange: to said second exchange if the identification of said radio telephone has been registered as well as information indicating that it is the home exchange of said radio telephone; and wherein said third exchange does not transmit said answer signal to said second exchange.

2. A private network system according to claim 1, further comprising:

third radio connection controller to be connected to said second exchange;

wherein said first registration means further recording an identification code of said first radio connection controller in correspondence to the identification code of said radio telephone when said radio telephone is communicable with said first connection controller;

wherein said second registration means further registering an identification code of said second radio connection controller in correspondence to the identification code of said radio telephone when said radio telephone is communicable with said second connection controller, and upon receipt of said position registration request signal from said radio telephone through said third radio connection controller, updating the identification code of said second radio connection controller which has been registered corresponding to said radio telephone, so that the identification code may correspond to that of said third radio connection controller; and wherein said second connecting means connects the incoming call directed to said radio telephone, when the incoming call is transferred by said transfer means, to said radio telephone through one of said second radio connection controller and said third radio connection controller registered in said second registration means in correspondence to said radio telephone.

3. A private network system according to claim 1, wherein said radio telephone further includes:

first recording means for recording an identification code of said first exchange which is the home exchange of said radio telephone; and home exchange notification signal transmission means for transmitting a home exchange notification signal including the identification code of the first exchange to be recorded in said first recording means, when said position registration request signal transmission means transmits said position registration request signal;

wherein said terminal movement notification signal transmission means in said second exchange transmits said terminal movement notification signal to said first exchange referring to the identification code of said first exchange added to said home exchange notification signal upon receipt of the home exchange notification signal from said radio telephone through said second radio connection controller; and wherein said second registration means registers the identification code of said first exchange as the home exchange in correspondence to the identification code of said radio telephone upon receipt of the home exchange notification signal from said radio telephone through said second radio connection controller referring to the identification code of said first exchange added to said home exchange notification signal.

4. A private network system according to claim 3, wherein further said first exchange transmits a movement registration success signal indicating completion of the registration in said first registration means when said first registration means completes the registration of the identification code of the second exchange as the visitor exchange in correspondence to the identification code of the radio telephone; and wherein further still said second exchange transmits said movement registration success signal to said radio telephone through said second radio connection controller upon receipt of said movement registration success signal from said first exchange.

5. A private system according to claim 1, further comprising:

wherein said registration means refers to the identification code of said first exchange included in said answer signal upon receipt of said answer signal from said first exchange, and registers the identification code of said first exchange as the home exchange in correspondence to the identification code of said radio telephone.

6. A private network system according to claim 1, wherein said transfer means transmits a transfer connection request signal including the identification code of said radio telephone and the identification code of said second exchange to said second exchange for transferring the incoming call;

wherein said second connecting means refers to the identification code of said radio telephone included in said transfer connection request signal upon receipt of said transfer connection request signal from said transfer means, and transmits an incoming call request signal to said radio telephone, and upon receipt of a reply signal to said incoming call request signal from said radio telephone, transmits said reply signal to said first exchange;

wherein said transfer means transmits the incoming call upon receipt of said reply signal from said second exchange; and wherein said second connection means connects said incoming call to said radio telephone through said second radio connection controller.

7. A private network system according to claim 1, wherein said second registration means preliminarily registers an extension number together with information indicating that it is the visitor exchange, and registers the identification code of said radio telephone in correspondence to said extension number.

8. A private network system according to claim 1, wherein said second radio connection controller comprises:

position registration instruction request signal transmission means for periodically transmitting a position registration instruction request signal including the identification of the second radio connection controller; and said radio telephone further includes:

second recording means for recording an identification code of a radio connection controller to which the radio telephone is communicable;

comparing means for comparing the identification code of said second radio connection controller included in said position registration instruction request signal with the identification code of the radio connection controller previously recorded in said second recording means to determine whether or not these identification codes correspond; and controlling means for controlling said position registration request signal transmission means to transmit said position registration request signal when the identification codes are found not to correspond with each other as a result of the comparison by said comparing means.

9. A private network system according to claim 1, wherein said radio telephone further includes:

input means for accepting an instruction to register the radio telephone in said second exchange; and control means for controlling said position registration request signal transmission means to transmit said position registration request signal upon acceptance of the instruction to register the radio telephone by said input means.

10. A private network system according to claim 1, further comprising:

a common channel signaling line for communication of the terminal movement notification signal of the radio telephone between said first exchange and said second exchange, wherein said terminal movement notification transmission means transmits said terminal movement notification signal through said common channel signaling line.

11. A private network system according to claim 1 further comprising:

a database memory which is accessible by said first and said second exchanges, said database memory storing the identification code of said radio telephone, the identification of the radio connection controller which is communicable with said radio telephone, and the identification code of the first exchange which is the home exchange of said radio telephone, in correspondence to one another;

wherein said terminal movement notification transmission means in said second exchange transmits said terminal movement notification signal to said first exchange by referring to said database memory to extract the identification code of said first exchange which is the home exchange of said radio telephone.

12. A private network system according to claim 11, wherein said database memory further stores at least one of information entries of a service class and origination call restriction which are predetermined in said first exchange of said radio telephone; and said second exchange controls said radio telephone in a manner preliminarily determined by said service class by referring said database memory.

13. A private network system, comprising:

a plurality of exchanges for exchanging telephone calls;

a plurality of radio telephones, whose home exchanges are respectively selected from said plurality of exchanges, said plurality of radio telephones each comprising position registration request signal transmission means for transmitting a position registration request signal including an identification code of each of said plurality of radio telephones, respectively; and a plurality of radio connection controllers, each of which are respectively connected to any one of said plurality of exchanges, said plurality of radio connection controllers each transmitting said position registration request signal to one of said plurality of exchanges connected thereto respectively, upon receipt of said position registration request signal from each of said plurality of radio telephones, each of said plurality of exchanges comprises:

home recording means for recording an identification code of a radio telephone whose home exchange is one of said plurality of exchanges;

visitor recording means for recording an identification code of a radio telephone whose visitor exchange is one of said plurality of exchanges;

visitor registration means for registering an identification code of said radio telephone included in said position registration request signal in said visitor recording means when the identification code included in said position registration request signal is not recorded in said home recording means upon receipt of said position registration request signal through the radio connection controller connected to one of said plurality of exchanges, terminal movement notification signal transmission means for transmitting a terminal movement notification signal including the identification code of said radio telephone and the identification code of the visited exchange, the identification code of said radio telephone included in said position registration request signal is not recorded in said home recording means upon receipt of said position registration request signal through the radio connection controller connected to one of said plurality of exchanges, exchange registration means for registering the identification code of the visited exchange included in said terminal movement notification signal in said home recording means in correspondence to the identification code of said radio telephone upon receipt of a terminal movement notification signal from the visited exchange, said terminal movement notification signal including the identification code of said radio telephone whose home exchange is one said plurality of exchanges, home switching means for connecting an incoming call upon receipt thereof which is directed to said radio telephone whose identification code is recorded in said home recording means and no exchange is registered in correspondence to the identification code of said radio connection controller connected to one of said plurality of exchanges, transfer means for transferring the incoming call upon receipt thereof to the visited exchange, when the incoming call is directed to a radio telephone, whose identification code is recorded in said home recording means and the identification code for the visited exchange is registered in correspondence to the identification code of said radio telephone in said home recording means, the visited exchange being registered in said home recording means in correspondence to the identification code of said radio telephone, and visitor switching means for connecting an incoming call which is transferred from the home exchange and which is directed to a radio telephone whose identification code is recorded in said visitor recording means, to said radio telephone through a radio connection controller connected to the visited exchange;

wherein said terminal movement notification signal transmission means transmits said terminal movement notification signal to each of the plurality of exchanges;

wherein said home exchange refers to said home recording means upon receipt of said terminal movement notification signal, and transmits an answer signal: including the identification code of said home exchange: to said visited exchange if the identification of said radio telephone has been registered as well as information indicating that it is the home exchange of said radio telephone; and wherein all the plurality of exchanges do not transmit said answer signal to said visited exchange except for said home exchange.

14. A private network system according to claim 13, further comprising:

home position registration means for registering an identification code of the radio connection controller when said one of the plurality of exchanges receives said position registration request signal through the radio connection controller connected to said one of the plurality of exchanges, in said home recording means in correspondence to the identification code of a radio telephone, when the identification code of said radio telephone included in said position registration request signal has been recorded in said home recording means; and visitor position registration means for registering an identification code of the radio connection controller when said one of the plurality of exchanges receives said position registration request signal through the radio connection controller connected to said one of the plurality of exchanges, in said visitor recording means in correspondence to the identification code of a radio telephone, when the identification code of said radio telephone included in said position registration request signal has not been recorded in said home recording means, wherein said terminal movement notification signal transmission means inhibits the transmission of said terminal movement notification signal upon receipt of said position registration request signal through the radio connection controller connected to itself and when the identification code included in said position registration request signal has not been recorded in said home recording means, and said visitor recording means has the identification code of said radio connection controller recorded in correspondence to the identification code of said radio telephone, wherein said home exchange performs switching through the radio connection controller which corresponds to the radio telephone to which the incoming call is directed and which is recorded in said home recording means, and wherein said visitor exchange means performs switching through the radio connection controller which corresponds to the radio telephone to which the incoming call is directed and which is recorded in said visitor recording means.

\* \* \* \* \*